No. 641,171. Patented Jan. 9, 1900.
C. L. WAGANDT.
SHEET METAL HANDLE.
(Application filed July 19, 1899.)

(No Model.)

Witnesses:
Wm. H. Vail
Charles B. Mann Jr.

Inventor:
Charles L. Wagandt
By Chas. B. Mann
Attorney.

UNITED STATES PATENT OFFICE.

CHARLES L. WAGANDT, OF BALTIMORE, MARYLAND.

SHEET-METAL HANDLE.

SPECIFICATION forming part of Letters Patent No. 641,171, dated January 9, 1900.

Application filed July 19, 1899. Serial No. 724,362. (No model.)

*To all whom it may concern:*

Be it known that I, CHARLES L. WAGANDT, a citizen of the United States, residing at Baltimore, in the State of Maryland, have invented certain new and useful Improvements in Sheet-Metal Handles, of which the following is a specification.

This invention relates to an improvement in constructions for attaching handles to sheet-metal covers.

The invention is illustrated in the accompanying drawings, in which—

Figure 1:
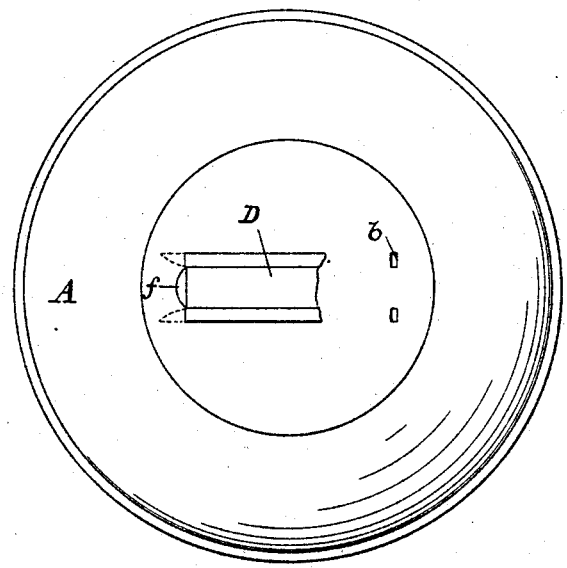
Figure 2:
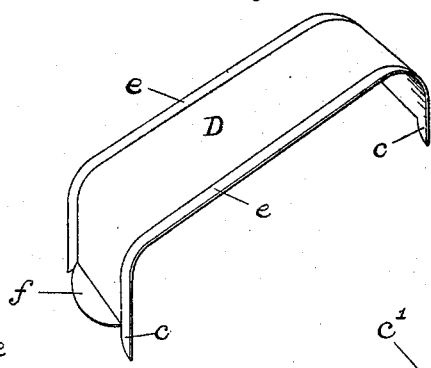
Figure 4:
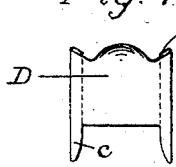
Figure 5:
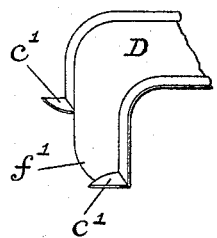
Figure 3:
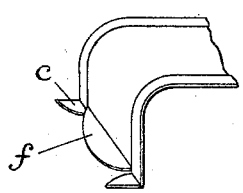

Figure 1 is a top view of a cover, showing part of the handle attached, the other part being broken away to disclose the holes in the cover. Fig. 2 is a perspective view of the handle, showing the parts at both ends in the preliminary position. Fig. 3 is a perspective view of one end of the handle, showing the end tangs and flange in the finished position, as when secured on the cover. Fig. 4 is a cross-section of the handle. Fig. 5 shows a modification in the handle.

The cover A here shown is such as is commonly used on buckets, cans, saucepans, and similar vessels made of tin-plate or enameled ware. In preparing the cover four holes or slits $b$ are punched through the cover, preferably from the bottom side upward, and thus the burs produced will be on the upper side. These holes are in proper position to receive the end tangs $c$ on the opposite ends of the loop handle D. The handle may be made of tin-plate or uncoated steel-plate, and the two parallel edges are folded, as at $e$, to stiffen them. In the preliminary position of the end tangs $c$, Figs. 1 to 4, they project straight down in line with the folded edges at the handle ends. Each end of the handle adjoining the end tangs has a lateral flange $f$. These flanges are short and extend crosswise of the ends between the said two folded edges and just above the end tangs. A handle having the parts thus described is then put in position for permanent attachment to the cover. The handle is seated upon the cover, the end tangs $c$ projecting down through the holes $b$, and the lateral flange $f$ at each end of the handle resting flat upon the top surface of the cover, as in Fig. 1. By means of suitable tools the end tangs $c$ on the under side of the cover are then bent laterally, so as to point in the same direction as the flanges $f$ and lie flat against the under side of the cover. The finished position of the end tangs is shown by broken lines in Fig. 1. In the finished article the metal of the cover is between the lateral flanges $f$ on the handle and the bent end tangs $c$ of the handle, and by this construction the handle is firmly attached to the cover, no rivets or solder being required.

It will be seen that in the finished article the three tangs are at right angles with said handle and extend in alinement with the length of the handle.

The modification shown in Fig. 5 differs from Fig. 2 only in that preliminarily the center becomes the down-projecting tang $f'$ and the parts $c'$ become the lateral flanges, being, in fact, a mere reversal of the other form.

In the finished article (the handle secured to the cover) both forms produce the same result. The metal of the cover is between the lateral flanges and the bent end tangs on the handle.

Having thus described my invention, what I claim as new, and desire to secure by Letters Patent, is—

1. A cover and handle united as herein set forth, consisting of the cover, A, having slits; and the sheet-metal loop handle D, provided at each end with three tangs at right angles with said handle of which one rests on the upper surface of the cover and extends in alinement with said handle, and of which two project down through said slits in the cover and rest laterally against the lower surface of the cover and extend in alinement with said handle, as set forth.

2. A cover and handle united as herein set forth, consisting of the cover, A, having slits; and the sheet-metal loop handle provided at each end with three tangs at right angles with said handle one or more of which project through said slits and of which two rest against one surface of the cover and one rests against the other surface of the cover all of said tangs being in alinement with the handle, as set forth.

In testimony whereof I affix my signature in the presence of two witnesses.

CHARLES L. WAGANDT.

Witnesses:
CHAS. B. MANN,
CHARLES VIETSCH.